US009252656B2

United States Patent
Tong (10) Patent No.: US 9,252,656 B2
(45) Date of Patent: Feb. 2, 2016

(54) BRIDGELESS INTERLEAVED POWER FACTOR CORRECTION CIRCUIT USING A PFC INDUCTOR WITH QUAD-WINDING ON A SINGLE CORE

(71) Applicant: XP Power Limited, Singapore (SG)

(72) Inventor: Vinh Quang Tong, Mission Viejo, CA (US)

(73) Assignee: XP Power Limited, Singapore (SG)

( * ) Notice: Subject to any disclaimer, the term of this patent is extended or adjusted under 35 U.S.C. 154(b) by 295 days.

(21) Appl. No.: 13/797,650

(22) Filed: Mar. 12, 2013

(65) Prior Publication Data

US 2014/0268952 A1    Sep. 18, 2014

(51) Int. Cl.
  *H02M 5/42* (2006.01)
  *H02M 1/42* (2007.01)
  *H02M 1/00* (2007.01)
  *H02M 1/44* (2007.01)

(52) U.S. Cl.
  CPC .......... *H02M 1/4241* (2013.01); *H02M 1/4225* (2013.01); *H02M 1/44* (2013.01); *H02M 2001/0064* (2013.01); *Y02B 70/126* (2013.01)

(58) Field of Classification Search
  CPC ............... G05F 1/33; G05F 1/12; G05F 1/34
  USPC ...................................... 363/89, 136, 113, 81
  See application file for complete search history.

(56) References Cited

U.S. PATENT DOCUMENTS

| 4,384,321 | A | * | 5/1983 | Rippel | ............... H02M 1/4225 |
| | | | | | 320/DIG. 31 |
| 6,154,375 | A | * | 11/2000 | Majid et al. | ..................... 363/16 |
| 7,375,985 | B2 | * | 5/2008 | Wai | ...................... H02J 7/0013 |
| | | | | | 320/108 |
| 7,605,570 | B2 | | 10/2009 | Liu et al. | |
| 2009/0200965 | A1 | * | 8/2009 | King | ............................. 315/307 |
| 2010/0253295 | A1 | * | 10/2010 | Tan et al. | ...................... 323/205 |
| 2011/0149622 | A1 | | 6/2011 | Lin | |
| 2013/0094267 | A1 | * | 4/2013 | Heo | ...................... H02M 7/483 |
| | | | | | 363/132 |

FOREIGN PATENT DOCUMENTS

TW    201143262    12/2011

OTHER PUBLICATIONS

Musavi et al., "A High-Performance Single-Phase Bridgeless Interleaved PFC Converter for Plug-in Hybrid Electric Vehicle Battery Chargers", IEEE Transactions on Industry Applications, 2011, pp. 1833-1843, vol. 47, No. 4.

* cited by examiner

*Primary Examiner* — Jessica Han
*Assistant Examiner* — Lorena Bruner
(74) *Attorney, Agent, or Firm* — Van Pelt, Yi & James LLP (57) ABSTRACT

A bridgeless interleaved power factor correction (PFC) circuit using a single PFC choke having four windings formed on a single core to form the four input inductors of the PFC circuit. An AC-to-DC converter constructed using the bridgeless interleaved PFC circuit achieves high conversion efficiency with high power factor and low total harmonic distortion. Furthermore, the size of the PFC circuit is reduced by using a single PFC choke with quad-winding.

10 Claims, 6 Drawing Sheets

BRIDGELESS INTERLEAVED POWER FACTOR CORRECTION CIRCUIT USING A PFC INDUCTOR WITH QUAD-WINDING ON A SINGLE CORE

BACKGROUND OF THE INVENTION

The present invention relates to AC-to-DC converters, and more particularly, to a bridgeless interleaved power factor correction circuit with improved efficiency and simplified structure.

AC-to-DC converters are used to convert an AC input voltage, such as a fully-rectified AC line voltage form a power outlet, to a regulated DC output voltage at a desired output voltage level. To meet regulatory requirements, AC-to-DC converters are designed with power factor correction (PFC) to achieve a high power factor (0.9 or more) while reducing total harmonic distortion (THD). Various topologies have been proposed for AC-to-DC converters incorporating power factor correction (PFC). For example, a conventional boost topology uses a bridge rectifier (also referred to as a diode bridge) to rectify the AC input voltage to DC followed by a boost converter functioning as an active PFC circuit. The boost converter attempts to maintain a constant DC bus voltage on its output while drawing a current that is always in phase with and at the same frequency as the line voltage. However, the diode bridge suffers significant power loss and converters using the boost topology typically have poor power conversion efficiency.

Other PFC topologies have been proposed to improve the power conversion efficiency. For example, bridgeless PFC circuits using active switches in place of the low-side diodes have been proposed to reduce power loss and improve conversion efficiency. Also, interleaved PFC circuits using two or more converters in parallel but operating out of phase have been proposed to distribute the total power over the two converters while obtaining frequency multiplication. Finally, bridgeless interleaved PFC circuits have also been proposed to provide a converter with low loss, high efficiency and low EMI (electromagnetic interference).

BRIEF DESCRIPTION OF THE DRAWINGS

Various embodiments of the invention are disclosed in the following detailed description and the accompanying drawings.

FIG. 3, which includes FIGS. 3(a) and 3(b), illustrates an embodiment of a single-core-quad winding PFC inductor which can be applied in the PFC circuit of FIG. 2.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, an AC-to-DC converter includes a bridgeless interleaved power factor correction (PFC) circuit using a single PFC choke having four windings formed on a single magnetic core to form the four input inductors of the PFC circuit. As thus configured, the AC-to-DC converter achieves high conversion efficiency with high power factor, low total harmonic distortion and low EMI emission. Furthermore, the size of the PFC circuit is reduced by using a single PFC choke with quad-winding.

In other embodiments of the present invention, a power converter includes an AC-to-DC converter implemented as a bridgeless interleaved power factor correction (PFC) circuit to convert an input AC voltage to a DC voltage. The power converter further includes an isolation transformer and multiple output converters to generate multiple regulated DC output voltages. In one embodiment, the PFC circuit uses a single PFC choke with quad-windings on a single core to form the four input inductors.

Figure 1:
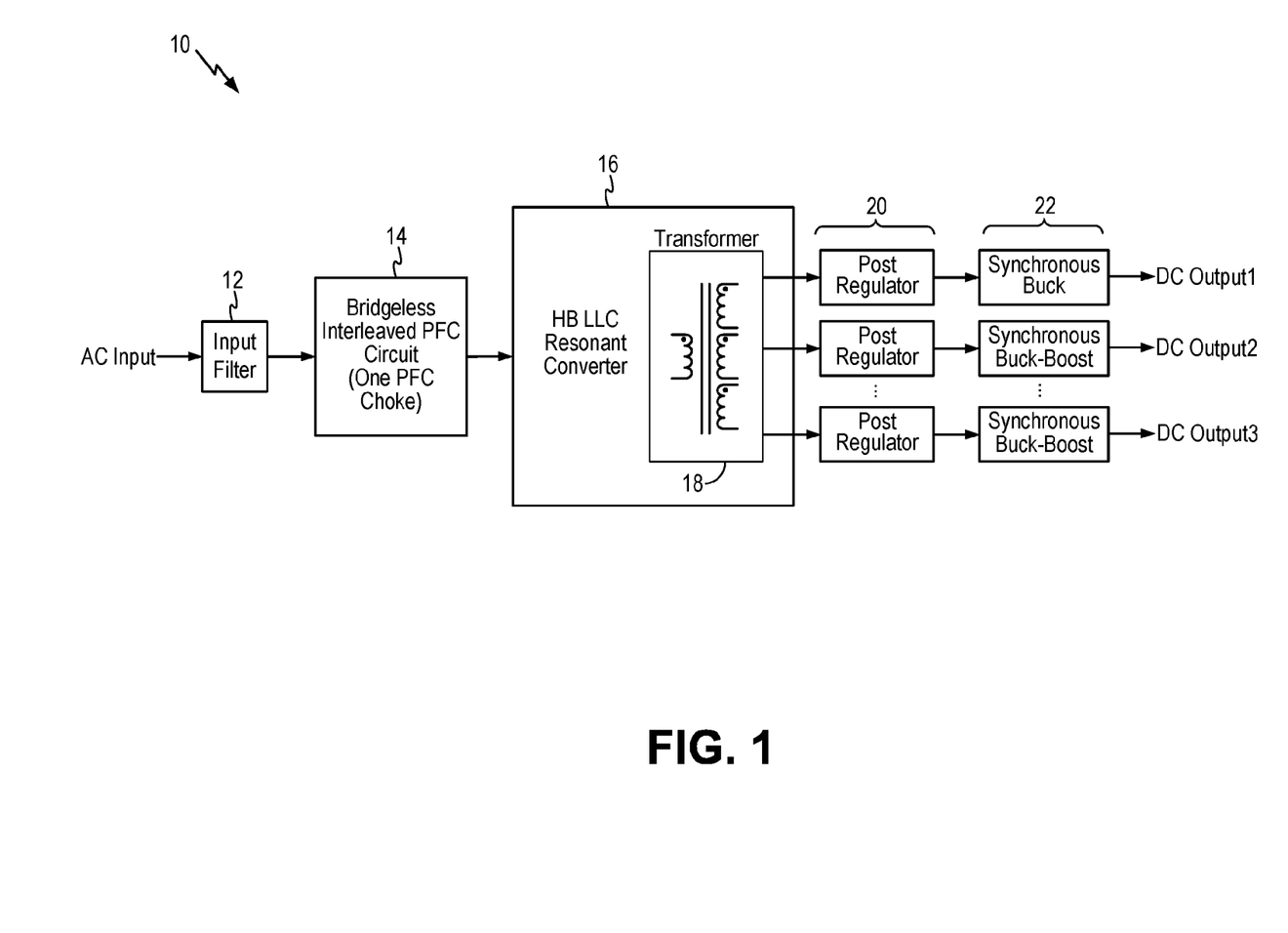
FIG. 1 is a schematic diagram illustrating an embodiment of an AC-to-DC power converter.

FIG. 1 is a schematic diagram illustrating an embodiment of an AC-to-DC power converter. Referring to FIG. 1, a power converter 10 receives an AC input voltage and generates one or more regulated DC output voltages at the same or different voltage levels. The power converter 10 includes an input filter 12 for EMI (electromagnetic interference) filtering. The power converter 10 further includes an AC-to-DC converter 14 implemented as a bridgeless interleaved power factor correction (PFC) circuit to convert the AC input voltage to a DC voltage. In embodiments of the present invention, the PFC circuit 14 is implemented using a bridgeless interleaved boost topology. Furthermore, in embodiments of the present invention, the PFC circuit 14 uses a single PFC choke having four windings formed on a single core to form the four input inductors of the PFC circuit. In this manner, both the size and cost of the PFC circuit 14 can be reduced.

The DC converted voltage from the PFC circuit is then coupled to a half-bridge LLC resonant converter 16 which generates one or more DC output voltages having voltage levels regulated by the duty cycle of the resonant converter. The operation of the half-bridge LLC resonant converter is well known and will not be further described. In the present embodiment, the half-bridge LLC resonant converter 16 is configured to provide multiple DC output voltages. The half-bridge LLC resonant converter 16 includes an isolation transformer 18 operative to transfer power supplied to the half-bridge LLC resonant converter 16 to multiple DC output voltages while providing isolation for the subsequent circuitry. In the present embodiment, transformer 18 includes a primary winding and multiple secondary windings to generate multiple DC output voltages.

Power converter 10 further includes a set of post regulators 20 receiving the output voltages from the half-bridge LLC resonant converter 16 and generating respective DC output voltages. The DC output voltages generated by the post regulators 20 may not have the accuracy level desired. Power converter 10 further includes a set of synchronous buck or buck-boost converters 22 to receive the output voltages of the post regulators 20 and generate a set of regulated DC output voltages DC Output1 to DC Output3. The synchronous buck or buck-boost converters 22 generate regulated DC output voltages having the desired voltage value within the desired accuracy limits. In this manner, power converter 10 generates multiple regulated DC output voltages from the AC input voltage.

Figure 2:
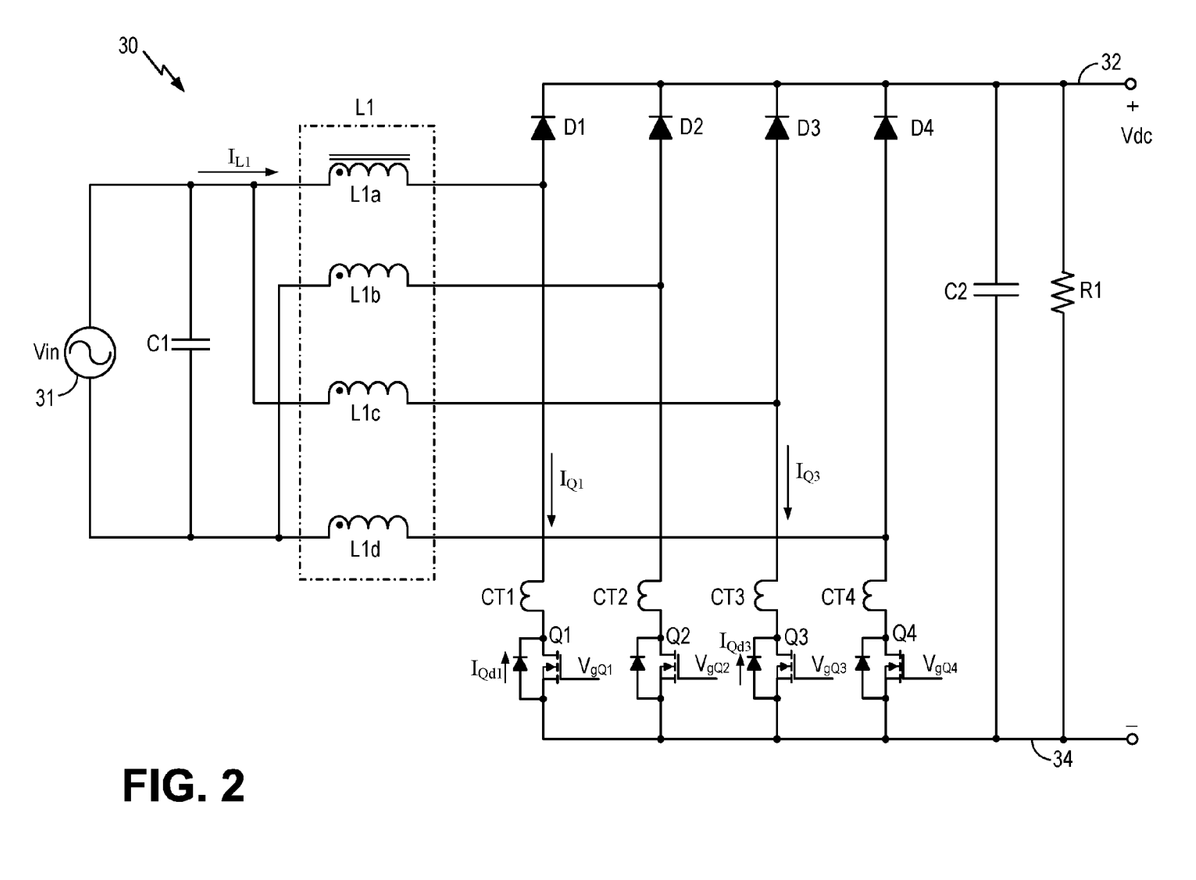
FIG. 2 is a schematic diagram illustrating an embodiment of a bridgeless interleaved PFC circuit.

FIG. 2 is a schematic diagram illustrating an embodiment of a bridgeless interleaved PFC circuit. Referring to FIG. 2, a bridgeless interleaved PFC circuit 30 receives an AC input voltage Vin, as symbolized by an AC voltage source 31, and generates a DC output voltage Vdc across output nodes 32, 34. The AC input voltage Vin may be a fully-rectified AC line voltage. PFC circuit 30 includes an input filter in the form of an input capacitor C1 for filtering the AC input voltage Vin. In some embodiments, capacitor C1 can be included as part of an input filter circuit separate from the PFC circuit. PFC circuit 30 implements a bridgeless interleaved boost topology and includes a PFC inductor L1, four active switches Q1 to Q4, four rectifier elements D1 to D4, and an output filter circuit in the form of an output capacitor C2. Resistor R1 represents the load of the PFC circuit. In embodiments of the present invention, the active switches Q1 to Q4 are MOSFET devices and in some embodiments, active switches Q1 to Q4 are NMOS transistors. Furthermore, in embodiments of the present invention, the rectifier elements D1 to D4 are PN junction diodes. To implement feedback control, PFC circuit 30 uses current transformers CT1 to CT4 to sense the current in each branch of the active switches to monitor the power output at each branch. The advantages of using current transformers for current sensing will be described in more detail below.

In embodiments of the present invention, the PFC inductor L1 includes four input inductors L1a to L1d formed as a single PFC choke. In the present description, a choke refers to a coil of conductive wire wound on a magnetic core. In the present description, the single PFC choke includes four windings formed on a single magnetic core where the four windings are insulated from each other on the core. The directions of the windings on the single core are chosen to ensure the flux of each input inductor do not conflict in operation. The single-core-quad-winding PFC inductor L1 realizes significant reduction in EMI as compared to conventional implementations where the four inductors are formed on four separate chokes. When a bridgeless interleaved PFC circuit is formed using four inductors on four separate chokes as in conventional implementations, the EMI generated by the four chokes are often too large to render the PFC circuit impractical for most applications. In embodiments of the present invention, the PFC inductor L1 of the PFC circuit is formed using a single choke having four windings on a single core to significantly reduce the EMI generated, thereby making the bridgeless interleaved boost topology practical in a PFC circuit for most applications. Furthermore, the single-core-quad-winding implementation consumes less space and reduces the cost and size of the PFC circuit. In PFC circuit 30, the AC input voltage source is connected across pairs of the input inductors. That is, the AC input voltage source has a first terminal (e.g., the AC line voltage terminal) connected to input inductors L1a and L1c and a second terminal (e.g., the neutral terminal) connected to input inductors L1b and L1d.

Figure 3:
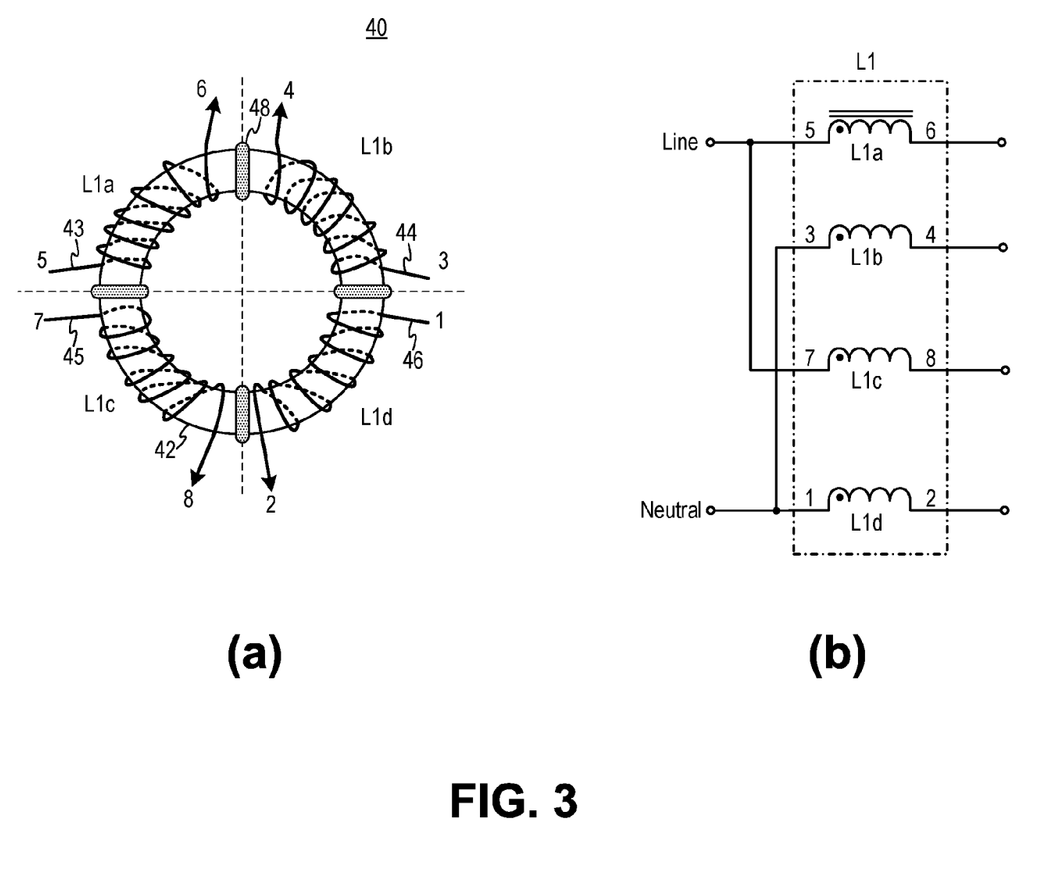

FIG. 3, which includes FIGS. 3(a) and 3(b), illustrates an embodiment of a single-core-quad winding PFC inductor which can be applied in the PFC circuit of FIG. 2. Referring to FIG. 3, a PFC choke 40 includes a single magnetic core 42 and four windings 43-46 formed there on to form four inductors L1a, L1b, L1c and L1d. The four windings 43-46 are distributed in four quadrants of the core 42 and are insulated from each other by an insulator 48. The four windings forming the input inductors L1a, L1b, L1c and L1d are configured with specific directional arrangement so that the flux from one inductor winding do not conflict with the others. To illustrate the directional arrangement of the four windings 43-46, FIGS. 3(a) and 3(b) includes reference numbers 1-8 to denote the terminals of input inductors L1a, L1b, L1c and L1d. In some embodiments, the direction of the windings is related to the phase the inductor winding is used for. The direction of the windings is chosen so that the flux from different phases cancels out each other. For example, in the present configuration, inductors L1a and L1b conduct current during the same phase and inductors L1c and L1d conduct current during the same phase. The windings 43 and 45, associated with inductors L1a and L1c, are configured so that their flux cancels each other out. Similarly, windings 44 and 46, associated with inductors L1b and L1d, are configured so that their flux cancels each other out. Other wiring configuration can be used to form the single PFC choke with quad windings. The winding direction configuration shown in FIG. 3(a) is illustrative only and is not intended to be limiting.

Returning to FIG. 2, the input inductors L1a to L1d, the active switches Q1 to Q4 and the rectifier elements D1 to D4 are connected to form two common interleaved fast bridge boost converters. More specifically, inductors L1a and L1b, switches Q1 and Q2 and diodes D1 and D2 form a first boost converter while inductors L1c and L1d, switches Q3 and Q4 and diodes D3 and D4 form a second boost converter. The active switches Q1 to Q4 are controlled by gate drive signals $V_{gQ1}$ to $V_{gQ4}$ to operate in an interleave mode where the two boost converters are operating 180° out of phase. The control circuit for generating the gate drive signals $V_{gQ1}$ to $V_{gQ4}$ (not shown) can be implemented in various ways to control the interleaved operation and to adjust the duty cycle of the two boost converters.

The operation of the PFC circuit 30 will be described with respect to the positive and negative half cycles of the AC input voltage. During the positive half cycle, when the AC input voltage Vin is positive, switches Q1 and Q2 of the first boost converter are turned on and current flows through input inductor L1a and switch Q1 and then through switch Q2 and input inductor L1b where the current returns to the line. During the interval when switches Q1 and Q2 are turned on, energy is stored in inductors L1a and L1b. Then, during the interval when switches Q1 and Q2 are turned off, the energy stored in inductors L1a and L1b is released and current flows through diode D1 and the load (represented by resistor R1) and returns through the body diode of switch Q2 back to the line.

In the interleaved mode, the second boost converter operates in the same manner as described above but at 180° out of phase to the first boost converter. Thus, during the positive half cycle, switches Q3 and Q4 of the second boost converter are turned on (out of phase with switches Q1/Q2) and current flows through input inductor L1c, switch Q3, switch Q4 and input inductor L1d where the current returns to the line. During the interval when switches Q3 and Q4 are turned on, energy is stored in inductors L1c and L1d. Then, during the interval when switches Q3 and Q4 are turned off, the energy stored in inductors L1c and L1d is released and current flows through diode D3 and the load (represented by resistor R1) and returns through the body diode of switch Q4 back to the line.

During the negative half cycle, when the AC input voltage Vin is negative, switches Q1 and Q2 of the first boost converter are turned on and current flows through input inductor L1b and switch Q2 and then through switch Q1 and input inductor L1a where the current returns to the line. During the interval when switches Q1 and Q2 are turned on, energy is stored in inductors L1a and L1b. Then, during the interval when switches Q1 and Q2 are turned off, the energy stored in inductors L1a and L1b is released and current flows through diode D2 and the load (represented by resistor R1) and returns through the body diode of switch Q1 back to the line.

In the interleaved mode, the second boost converter operates in the same manner as described above but at 180° out of phase to the first boost converter. Thus, during the negative half cycle, switches Q3 and Q4 of the second boost converter are turned on (out of phase with switches Q1/Q2) and current flows through input inductor L1d, switch Q4, switch Q3 and input inductor L1c where the current returns to the line. During the interval when switches Q3 and Q4 are turned on, energy is stored in inductors L1c and L1d. Then, during the interval when switches Q3 and Q4 are turned off, the energy stored in inductors L1c and L1d is released and current flows through diode D4 and the load (represented by resistor R1) and returns through the body diode of switch Q3 back to the line.

Figure 4:
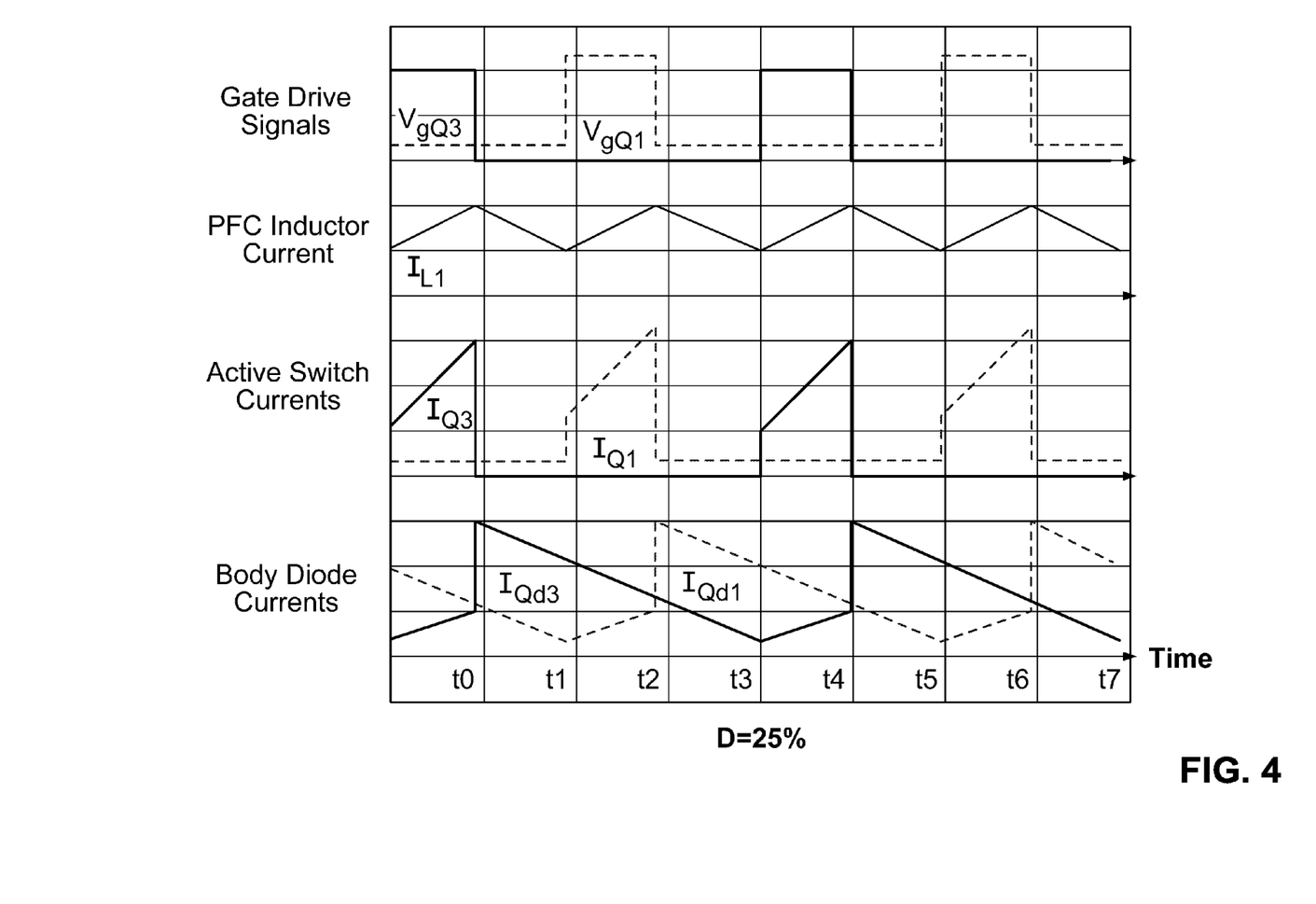
FIGS. 4-6 illustrate waveforms for the PFC circuit of FIG. 2 at duty cycle of 25%, 50%, and 75%, respectively.
Figure 5:
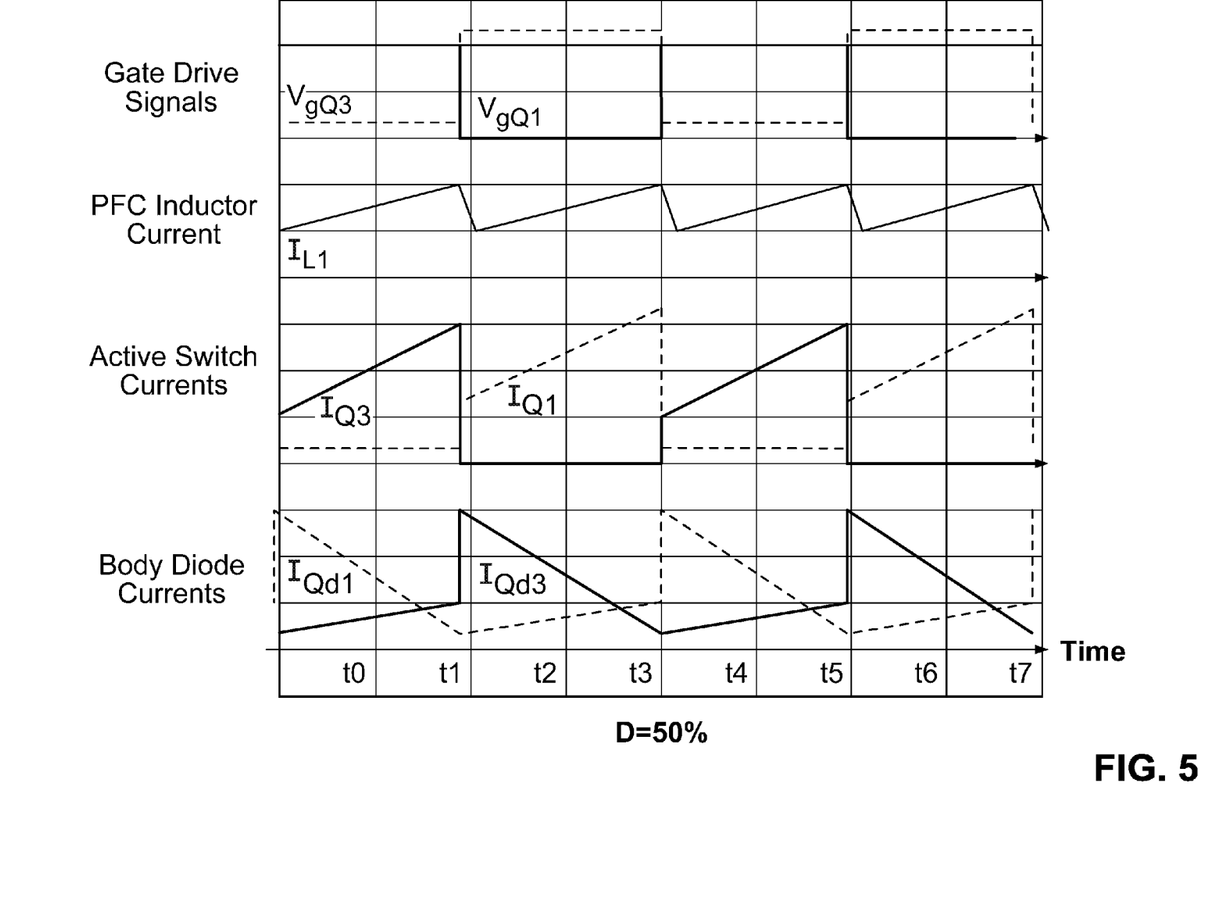
Figure 6:
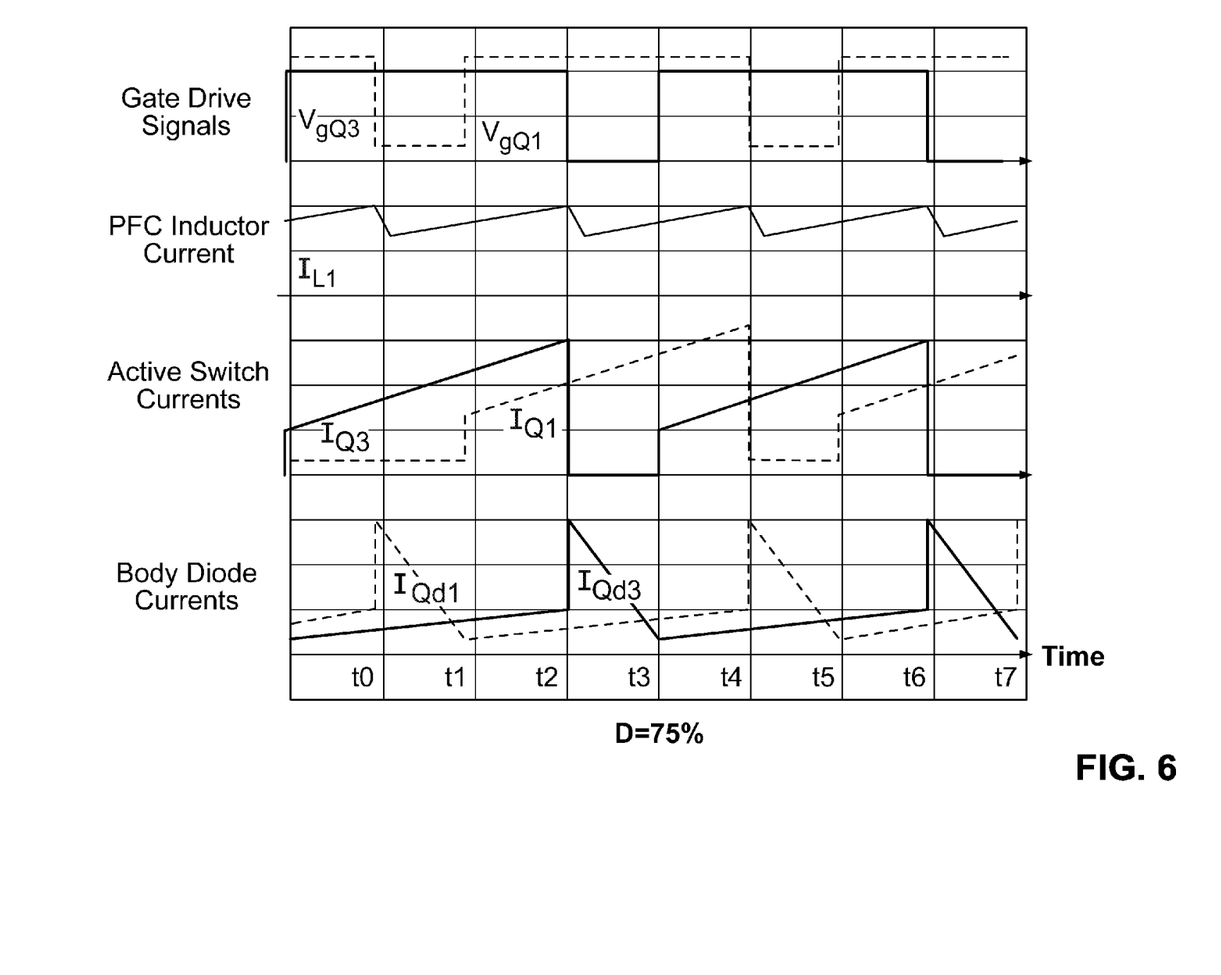

FIGS. 4-6 illustrate waveforms for the PFC circuit of FIG. 2 at duty cycle of 25%, 50%, and 75%, respectively. In each of FIGS. 4-6, the gate drive signals $V_{gQ1}$ and $V_{gQ3}$ for switches Q1 and Q3, respectively, are shown. The gate drive signal for switch Q2 is the same as switch Q1 while the gate drive signal for switch Q4 is the same as switch Q3. FIGS. 4-6 also illustrate the inductor current $I_{L1}$, the active switch currents $I_{Q1}$ and $I_{Q3}$, and the body diode currents $I_{Qd1}$ and $I_{Qd3}$.

The bridgeless interleaved PFC circuit of the present invention using a PFC inductor formed as a single PFC choke achieves many advantages over conventional bridgeless interleaved PFC circuit. In particular, when the PFC inductor is implemented using four windings on a single core instead of four separate chokes, the EMI generated by the PFC inductor is significantly reduced, allowing the bridgeless interleaved PFC circuit to be applied in practical applications and meeting regulatory emission requirements. The bridgeless interleaved PFC circuit of the present invention retains the benefits of high power factor, high efficiency and low total harmonic distortion. The bridgeless interleaved PFC circuit of the present invention can be applied in any power supply applications but it is particularly beneficial in power supply applications where the power output is equal to or higher than 1000 W.

Returning to FIG. 2, in embodiments of the present invention, current transformers CT1 to CT4 are used to sense the current flowing through each diode and switch branch for monitoring the power conversion of the PFC circuit and to adjust the duty cycle or on-time control of the active switches. In one embodiment, current transformers CT1-CT4 are high frequency current transformers. The use of current transformers for current sensing in the PFC circuit realizes several advantages. First, because current transformers does not require a common ground to sense the current, current transformers are particularly useful in the bridgeless topology when the current path for the active switch and the current path for the diode do not share the same ground. Second, in high voltage application, it is not practical to use resistors for current sensing due to large power dissipation by the resistor. A current transformer produces a reduced currently proportional to the current to be sensed and also isolates the measuring circuit from the circuit being monitored.

In FIG. 2, the current transformers CT1 to CT4 are shown connected in series to respective drain terminals of the active switches Q1 to Q4 to illustrate the location where current sensing is being performed. One of ordinary skill in the art would appreciate that the current transformer are coupled to sense the current in the branch and is not necessarily connected in series with the active switches and diodes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A bridgeless interleaved power factor correction circuit, comprising:
    an AC input voltage source having a first input terminal and a second input terminal and providing an AC input voltage;
    a PFC inductor configured to receive the AC input voltage, the PFC inductor comprising four input inductors formed as four windings on a single magnetic core, a first and third input inductors having first ends connected to the first terminal of the AC input voltage source, and a second and fourth input inductors having first ends connected to the second terminal of the AC input voltage source;
    first, second, third, and fourth active switches each having a control terminal receiving a respective control signal for turning the respective active switch on or off, each active switch having a first terminal connected to a second end of a respective one of the input inductors and a second terminal coupled to a first output terminal;
    first, second, third, and fourth rectifier elements each having an anode terminal connected to the second end of a respective one of the input inductors and a cathode terminal connected to a second output terminal; and
    an output filter circuit connected across the first and second output terminals, the first and second output terminals providing a DC output voltage,
    wherein the first and second input inductors, the first and second active switches and the first and second rectifier elements form a first bridge boost converter; and the third and fourth input inductors, the third and fourth active switches and the third and fourth rectifier elements form a second bridge boost converter; and
    wherein the first and second bridge boost converters are operated out of phase in response to the control signals to store energy in and to release energy from the input inductors to generate the DC output voltage from the AC input voltage source.

2. The bridgeless interleaved power factor correction circuit of claim 1, wherein the PFC inductor comprises four windings on the single magnetic core to form the four input inductors, the direction of each of the four windings on the single magnetic core is selected as a function of the phase each input inductor is associated with.

3. The bridgeless interleaved power factor correction circuit of claim 2, wherein the direction of each of the four windings on the single magnetic core is selected to cancel the flux from windings in a different phase.

4. The bridgeless interleaved power factor correction circuit of claim 1, wherein the first, second, third, and fourth active switches comprise first, second, third and fourth MOSFET devices.

5. The bridgeless interleaved power factor correction circuit of claim 4, wherein the first, second, third and fourth MOSFET devices comprise first, second, third and fourth NMOS transistors.

6. The bridgeless interleaved power factor correction circuit of claim 1, wherein the first, second, third, and fourth rectifier elements comprise first, second, third, and fourth PN junction diodes.

7. The bridgeless interleaved power factor correction circuit of claim 1, wherein the output filter circuit comprises an output capacitor.

8. The bridgeless interleaved power factor correction circuit of claim 1, further comprising:
   a plurality of current transformers configured to sense the current flowing through the each of the first, second, third and fourth switches.

9. The bridgeless interleaved power factor correction circuit of claim 1, further comprising:
   an input filter coupled across the AC input voltage source configured to filter the AC input voltage.

10. The bridgeless interleaved power factor correction circuit of claim 9 wherein the input filter comprises an input capacitor.

\* \* \* \* \*